United States Patent
Kong (10) Patent No.: US 7,394,454 B2
(45) Date of Patent: Jul. 1, 2008

(54) DATA INPUT DEVICE AND METHOD FOR DETECTING LIFT-OFF FROM A TRACKING SURFACE BY ELECTRICAL IMPEDANCE MEASUREMENT

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/761,976

(22) Filed: Jan. 21, 2004

(65) Prior Publication Data

US 2005/0156876 A1 Jul. 21, 2005

(51) Int. Cl.
*G09G 5/00* (2006.01)

(52) U.S. Cl. ........................................ 345/163; 345/156

(58) Field of Classification Search ......... 345/156–158, 345/163–169, 173, 174; 250/221; 324/658, 324/691
See application file for complete search history.

(56) References Cited

U.S. PATENT DOCUMENTS

| | | | |
|---|---|---|---|
| 4,364,035 A | 12/1982 | Kirsch | |
| 4,794,384 A | 12/1988 | Jackson | |
| 5,453,644 A | 9/1995 | Yap et al. | |
| 5,574,480 A | 11/1996 | Pranger et al. | |
| 5,920,309 A | 7/1999 | Bisset et al. | |
| 6,281,882 B1 | 8/2001 | Gordon et al. | |
| 6,348,862 B1 * | 2/2002 | McDonnell et al. | |
| 6,448,977 B1 | 9/2002 | Braun et al. | |
| 6,515,651 B1 | 2/2003 | Berstis | |
| 6,531,692 B1 | 3/2003 | Adan et al. | |
| 6,587,093 B1 * | 7/2003 | Shaw et al. | ................. 345/163 |
| 6,661,410 B2 | 12/2003 | Casebolt et al. | |
| 6,859,141 B1 * | 2/2005 | Van Schyndel et al. | ...... 324/658 |
| 2002/0067334 A1 * | 6/2002 | Hinckley et al. | ............ 345/156 |
| 2002/0075006 A1 * | 6/2002 | Goldfine et al. | |
| 2003/0103037 A1 | 6/2003 | Rotzoll | |
| 2003/0136897 A1 * | 7/2003 | Rabkin | ....................... 250/221 |
| 2005/0035947 A1 | 2/2005 | Lutian | |

FOREIGN PATENT DOCUMENTS

| | | |
|---|---|---|
| JP | 3111925 A1 | 12/1991 |
| JP | 6180420 A1 | 6/1994 |
| JP | 11315075 A1 | 12/1999 |

OTHER PUBLICATIONS

Chen, et al., Design and Implementation of Capacitive Proximity Sensor Using Microelectromechanical Systems Technology, IEEE Transactions on Industrial Electronics, Dec. 1998, vol. 45, No. 6, Taiwan, R.O.C.

* cited by examiner

*Primary Examiner*—Regina Liang
(74) *Attorney, Agent, or Firm*—Senniger Powers LLP (57) ABSTRACT

A data input device comprising an impedance sensor arranged with respect to a tracking surface. The impedance sensor has a measurement zone within which the impedance sensor measures an electrical impedance. A controller of the device receives data from and is responsive to the impedance sensor for determining if the data input device is spatially separated from the tracking surface by at least a lift-off detection distance as a function of a measured impedance. The controller further initiates a non-tracking mode in which the controller suspends tracking of relative movement between the data input device and the tracking surface when the data input device is spatially separated from the tracking surface by at least the lift-off detection distance.

26 Claims, 8 Drawing Sheets

DATA INPUT DEVICE AND METHOD FOR DETECTING LIFT-OFF FROM A TRACKING SURFACE BY ELECTRICAL IMPEDANCE MEASUREMENT

TECHNICAL FIELD

Embodiments of the claimed invention relate to the field of computer input devices, and particularly data input devices, such as a mouse or optical pen, for detecting and tracking movement of or lift-off from a tracking surface. In particular, embodiments of this invention relate to methods and data input devices configured to interact with tracking surfaces and capable of energizing at least two electrodes operatively connected to the data input device, measuring an electrical impedance between the at least two electrodes, and determining the relative distance between the data input device and the tracking surface as a function of the measured impedance.

BACKGROUND OF THE INVENTION

Previous computer input devices, such as mice, include rotatable balls mounted within a housing, yet rotatably engaging a surface. As the housing of such a mouse translates across the surface, the ball rotates within the housing, engaging horizontally and vertically situated wheels that rotate against the ball, thereby indicating horizontal (e.g., side to side or x-direction) and vertical (e.g., back and forth or y-direction) movement of the mouse across the surface. When the device is lifted from the surface, hereinafter referred to as lift-off, the ball stops rotating and the horizontal and vertical movement information provided by the wheels stops. This feature is particularly useful to a user who has reached a point where the device can no longer move with respect to the tracking surface, but the user would like to continue tracking in that particular direction on screen. By lifting the device off of the tracking surface, the user can reposition the device, while the cursor remains stationary because tracking is suspended during lift-off. When tracking resumes, horizontal and vertical wheel rotation translates into an on-screen visual image of a cursor that responds to movement of the device. Because such devices have a moving ball passing through a hole in the housing, such devices often become contaminated with dust and dirt, which may yield inaccurate or intermittent cursor tracking. Moreover, the tracking surface and ball require sufficient friction between the two to cause rotation of the ball when the housing translates over the surface. To help provide such friction and minimize contamination of the device, specialized tracking surfaces (e.g., mouse pads) are well known in the art. Thus, a major limitation of such a device is that it requires a tracking surface with particular characteristics, such as adequate friction and cleanliness, which may not be readily found on all surfaces that would otherwise be useful for tracking.

Building upon these primarily mechanical tracking devices, optical tracking devices have become available. Such devices optically track movement of a surface, rather than mechanically as with the devices described immediately above. These optical tracking devices may avoid some of the drawbacks associated with the mechanical devices described above. In particular, optical devices are known not to require wheels in contact with a movable ball, which act as a common collection point for dust and dirt. Instead, the movable ball may be covered with a distinct pattern. As the ball rotates over a surface due to movement of the input device, photodetectors facing another side of the ball collect information about the movement of the ball's distinct pattern as the ball rotates. A tracking engine then collects this information, determines which way the pattern is translating and translates a cursor on the screen similarly, as described above. Lift-off detection is performed as discussed above, when lifted the ball stops moving such that the device stops tracking. These devices offer improvements over previous designs by eliminating moving parts (the wheels) and changing the ball detection interaction from mechanical to optical. However, such devices may lack the ability to track on any surface, requiring a suitable frictional interface between the ball and the surface. Moreover, these devices still require one moving part, namely, the ball. In addition, aliasing artifacts may cause a skipping cursor, rather than one moving fluidly.

Still other optical devices place a pattern on the tracking surface (e.g., a mouse pad), rather than on the rotatable ball, thereby using the mouse pad to generate optical tracking information. Although such devices may eliminate the moving ball, they are less universal by requiring a specific tracking surface to operate.

Other more recent optical tracking devices eliminate the need for a patterned ball or mouse pad. One such device utilizes an LED to project light across the tracking surface at a grazing angle relative to the tracking surface. The mouse then collects tracking information by two methods: first, by tracking changes in color on the tracking surface by any pattern that may appear on the tracking surface; or second, by detecting dark shadows cast by high points in the surface texture, which appear as dark spots. Such an LED device eliminates the moving ball of previous devices, and is useful on a variety of surfaces. However, smooth surfaces with little color variation, such as surfaces with a fine microfinish similar to glass or clear plastic, may prove difficult to track upon. More importantly, these systems lack the ability to detect when the device has been removed from the tracking surface (lift-off) for freezing the cursor. Without freezing the cursor upon lift-off, the tracking device will continue to track when the user is attempting to reposition the device on the tracking surface while leaving the cursor in the same place.

SUMMARY OF THE INVENTION

Accordingly, a data input device capable of energizing at least two electrodes operatively connected to the device, measuring an electrical impedance between the at least two electrodes, and determining a lift-off condition between the device and the tracking surface as a function of the measured impedance is desired to address one or more of these and other disadvantages.

In accordance with one aspect of the invention, a data input device comprises an impedance sensor arranged with respect to a tracking surface. The impedance sensor has a measurement zone within which the impedance sensor measures an electrical impedance. A controller receives and is responsive to the impedance sensor for determining if the data input device is spatially separated from the tracking surface by at least a lift-off detection distance as a function of a measured impedance. The controller initiates a non-tracking mode in which the controller suspends tracking of relative movement between the data input device and the tracking surface when the data input device is spatially separated from the tracking surface by at least the lift-off detection distance.

In another aspect of the invention, a method comprises energizing at least two electrodes operatively connected to a data input device configured to interact with a tracking surface and measuring an electrical impedance between the at least two electrodes. The method further comprises determining the relative distance between the data input device and the tracking surface as a function of the measured impedance.

In still another aspect of the invention, a data input device comprises a resistance sensor arranged with respect to a tracking surface. The resistance sensor has a measurement zone within which the resistance sensor measures an electrical resistance. A controller receives and is responsive to the resistance sensor for determining if the data input device is spatially separated from the tracking surface by at least a lift-off detection distance as a function of the measured resistance. The controller initiates a non-tracking mode generally as set forth above.

In yet another aspect of the invention, a method of detecting lift-off of a data input device from a tracking surface comprises energizing and measuring substantially as set forth above. The method further comprises initiating a non-tracking mode, in which a controller suspends tracking of relative movement between the data input device and the tracking surface, as a function of the measured impedance when the data input device is spatially separated from the tracking surface by at least a lift-off detection distance.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
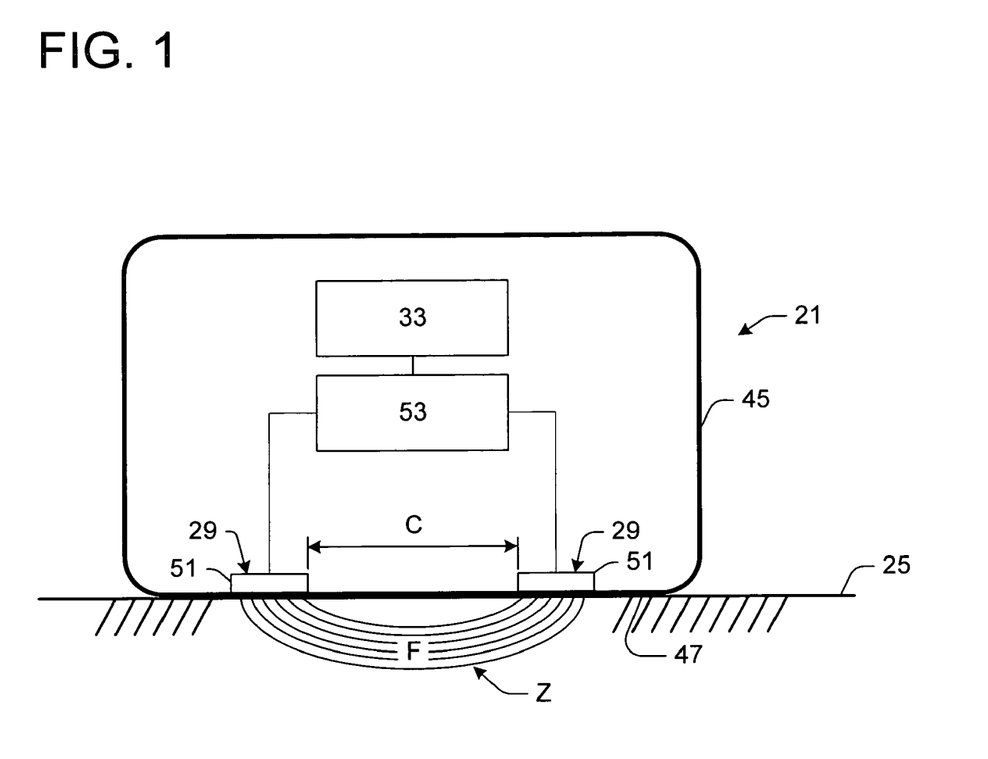
FIG. 1 is a schematic plan view of a device of the claimed invention engaging a tracking surface.
Figure 2:
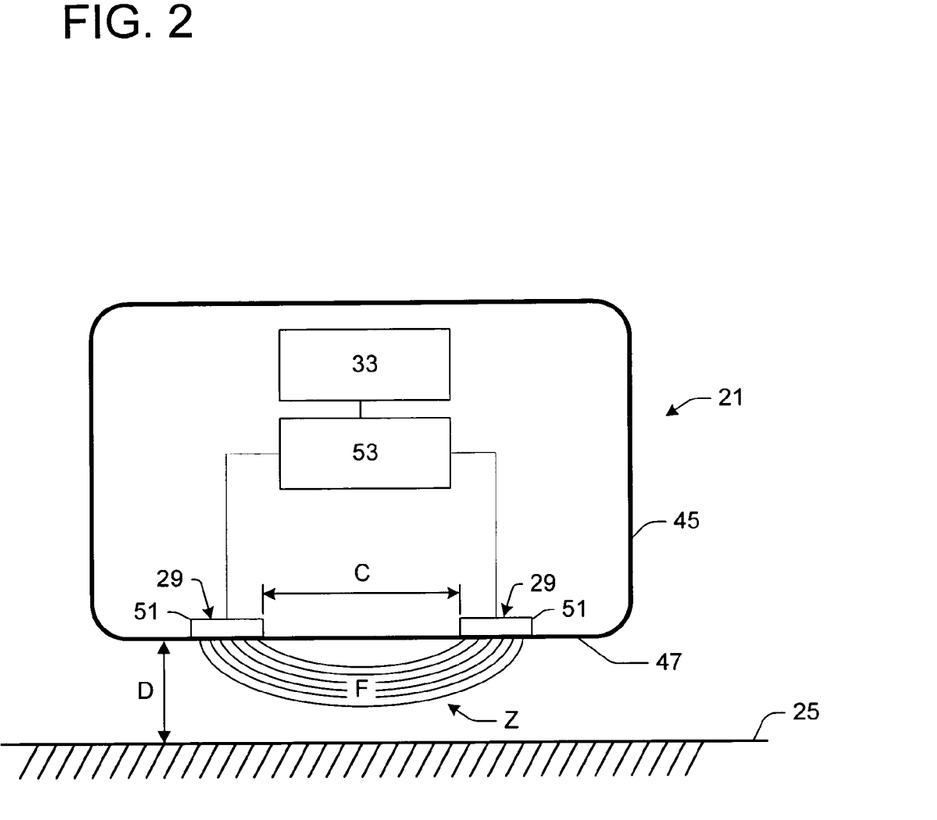
FIG. 2 is a schematic plan view of the device of FIG. 1 lifted from the tracking surface.

Referring first to FIGS. 1 and 2, a data input device, generally indicated 21, for use with a tracking surface 25 is depicted. Although such devices 21 are known to be capable of tracking relative movement between the device and the tracking surface 25 (described above as horizontal-vertical movement or x-y movement), it should be noted here that a focus of the present disclosure specifically involves lift-off detection. Any of the various tracking schemes known in the relevant art may be coupled with the teaching of the claimed invention for lift-off detection. It should be noted here that the terms "lift-off" or "lifting" the device 21 additionally comprise either lifting, or moving, the tracking surface 25 away from the stationary device (e.g., FIG. 9), or lifting the device away from the tracking surface (e.g., FIGS. 2 and 8). In addition, referring to relative movement between the device 21 and the tracking surface 25 in a z-direction may comprise movement of the device (e.g., a mouse moving over a mouse pad), movement of the tracking surface (e.g., a moving trackball or human skin moving in a measurement zone of a sensor), or movement of both the tracking surface and the device.

The data input device 21 generally comprises an impedance sensor, generally indicated 29, arranged with respect to the tracking surface 25. In particular, as depicted in FIGS. 1 and 2, the impedance sensor 29 is shaped and sized to face the tracking surface 25 when the data input device is in a tracking mode, as discussed in detail below. The impedance sensor 29 has a measurement zone, generally indicated Z, within which the impedance sensor measures an electrical impedance. This measurement zone Z coincides with the tracking surface 25 when the device 21 is in use, allowing the impedance sensor 29 to sense the proximity of the tracking surface.

The data input device 21 further comprises a controller 33 for receiving data from and responding to the impedance sensor 29 for determining if the data input device is spatially separated from the tracking surface 25 by at least a lift-off detection distance D as a function of a measured impedance. With information from the impedance sensor 29, the controller 33 initiates a non-tracking mode in which the controller suspends tracking of relative movement between the data input device 21 and the tracking surface 25, when the data input device is spatially separated from the tracking surface by at least the lift-off detection distance D (e.g., FIG. 2). The controller 33 is further responsive to the measured impedance of the impedance sensor 29 by initiating a tracking mode, in which the controller tracks relative movement between the data input device 21 and the tracking surface 25, when the data input device is not spatially separated from the tracking surface by at least the lift-off detection distance D (e.g., FIG. 1). In this manner, the controller 33 switches between the two modes of operation of the device 21 according to the measured impedance from the impedance sensor 29, which is indicative of the separation of the device and the tracking surface 25.

The data input device 21 further comprises a housing 45 shaped and sized to engage the tracking surface 25. In addition, the impedance sensor 29 and controller 33 are at least partially enclosed within the housing 45 to contain and protect the components of the device. As shown in FIGS. 1 and 2, the controller 33 is fully enclosed within the housing 45, while the impedance sensor 29 is partially enclosed, mounted on a surface of the housing and shaped and sized to engage the tracking surface 25. The housing 45 further includes a support surface 47 shaped and sized to engage the tracking surface 25 during the tracking mode of the device 21. The housing 45 may take any form, without departing from the scope of the claimed invention. In this example, the housing 45 may be formed in the shape of a mouse, a trackball, an optical pen or any other data input device 21. It is to be understood that housing 45 encloses tracking circuitry (not shown) known to those skilled in the art (e.g., a light source, a detector and a cross-correlation engine). As an example, the following U.S. Pat. No. is hereby fully incorporated by reference: U.S. Pat. No. 6,531,692 B1 issued to Adan et al., entitled "OPTICAL COUPLING ASSEMBLY FOR IMAGE SENSING OPERATOR INPUT DEVICE", and assigned to Microsoft Corporation.

As depicted in FIGS. 1-5, the impedance sensor 29 of the device 21 comprises two electrodes 51. In the several embodiments of the claimed invention, the impedance sensor 29 may be constructed to function in a variety of different ways, depending upon the desired sensing capabilities of the device 21. In this example, in one embodiment, the impedance sensor 29 may be a capacitance sensor for measuring an electrical capacitance between the two electrodes 51, thereby determining proximity of the data input device 21 and the tracking surface 25 relative one another as a function of the measured capacitance. The capacitance sensor creates a fringing field F extending beyond the housing 45 of the device. As different objects are placed within the fringing field F, the measured capacitance changes due to the presence of different materials. The data input device 21 can therefore determine the proximity of the tracking surface 25 relative to the device as a function of measured changes in the dielectric constant of the tracking surface and a dielectric constant of ambient air between the data input device and the tracking surface when separated from one another.

In this example, the presence of mainly air within the fringing field F (see FIG. 2) will yield a particular capacitance, because the dielectric constant of air is about one. The controller 33 will interpret such a capacitance measurement as the presence of a gap between the device 21 and the tracking surface 25. Conversely, the presence of mainly the tracking surface 25 within the fringing field F (see FIG. 2) will yield an increased capacitance because the dielectric constant of solids tend to be much greater than one. In this example, the dielectric constant of dry wood is between about two and about six, while the dielectric constant of rubber is between about two and about five. The controller 33 will interpret such a measurement as the presence of little or no gap between the device 21 and the tracking surface 25. Between these two exemplary capacitance measurements are a myriad of other capacitance measurements wherein the fringing field F includes both the tracking surface 25 and air space. The controller 33 may be tuned to interpret these capacitances as indicative of relative distances between the tracking surface 25 and the device 21, such that the distance between the device and the tracking surface is known and modes of operation of the device may be selected accordingly. In this manner, continuous capacitance measurements provide for continuous monitoring of the distance between the device 21 and the tracking surface 25, within a given working range of the device. The device 21 may further comprise a resistance-capacitance (RC) resonance circuit 53 shaped and sized to connect to the capacitance sensor for detecting capacitance changes and sending them to the controller 33, as would be readily understood by one skilled in the art.

Figure 3:
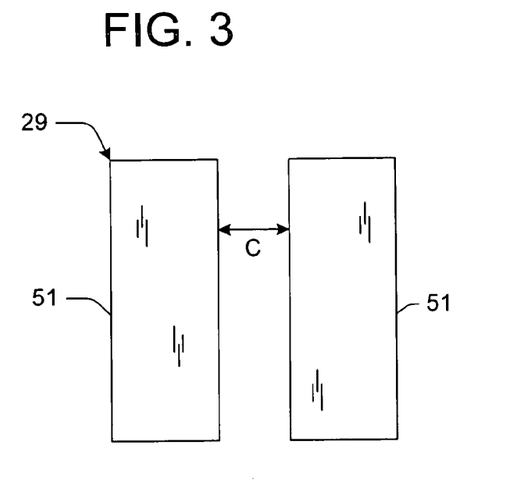
FIG. 3 is a schematic of a device of the claimed invention comprising two electrodes.
Figure 4:
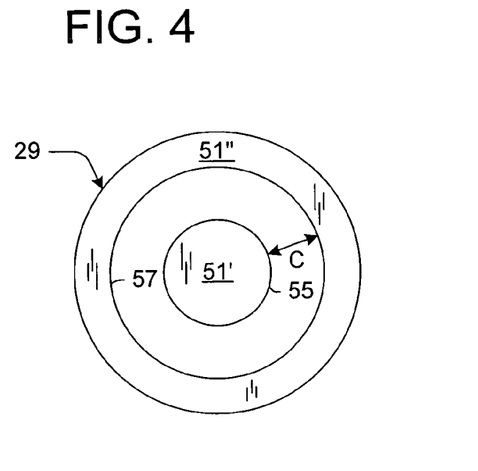
FIG. 4 is a schematic of another device of the claimed invention comprising two electrodes.
Figure 5:
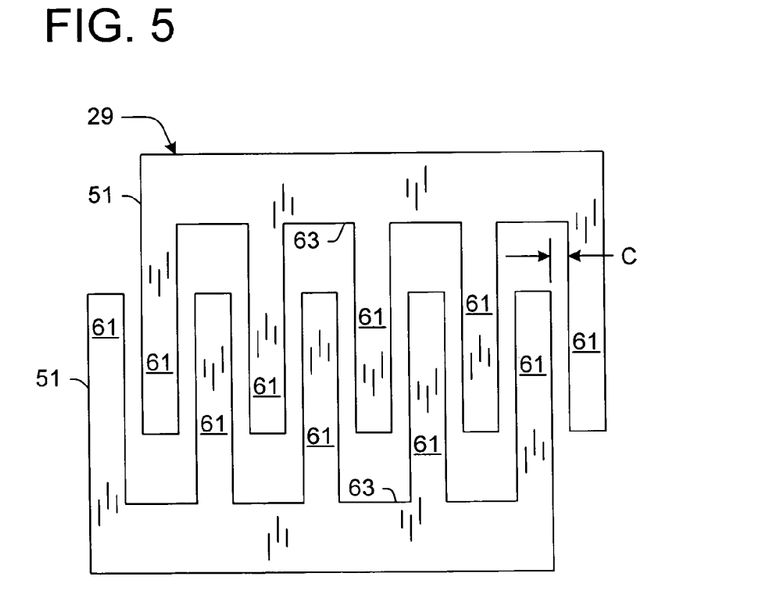
FIG. 5 is a schematic of yet another device of the claimed invention comprising two electrodes.

In such an embodiment, the two electrodes 51 are arranged adjacent one another, as depicted in FIGS. 3-5. In addition, the two electrodes 51 may be substantially equidistant from one another, such that they maintain a minimum clearance C with respect to one another. Referring now to FIG. 3, a schematic of two electrodes 51 substantially equidistant from one another is depicted. The electrodes 51 are arranged to maintain a minimum clearance C with respect to one another. In another particular embodiment depicted in FIG. 4, a schematic of another two electrodes 51 of the claimed invention is shown. A first electrode 51' comprises a substantially circular conductor and a second electrode 51" comprises a substantially annular conductor surrounding the substantially circular conductor of the first electrode. The first and second electrodes 51',51" maintain a minimum clearance C between one another between an outer perimeter 55 of the substantially circular conductor of the first electrode and an innermost edge 57 of the substantially annular conductor of the second electrode.

Another particular embodiment depicted in FIG. 5 shows yet another two electrodes of the claimed invention. First and second electrodes 51 comprise substantially comb-shaped conductors having digits 61 extending at regular intervals from an edge 63 of each electrode. The digits 61 of the first electrode 51 are interdigitized with the digits of the second electrode. When interdigitized, the first and second electrodes 51 maintain a minimum clearance C between one another between each opposed pair of interdigitized digits 61.

Figure 6:
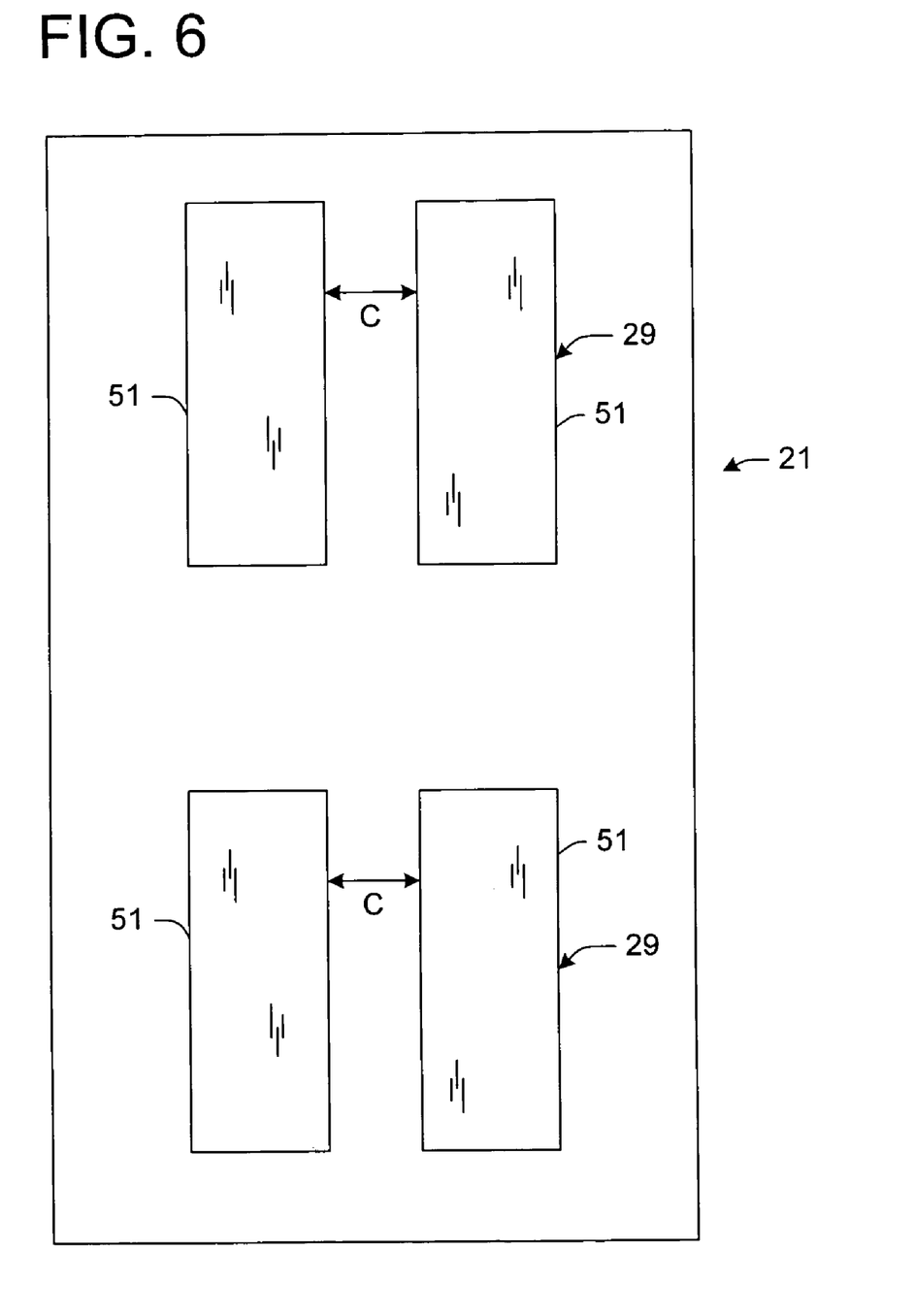
FIG. 6 is a schematic bottom view of still another device of the claimed invention comprising four electrodes.
Figure 7:
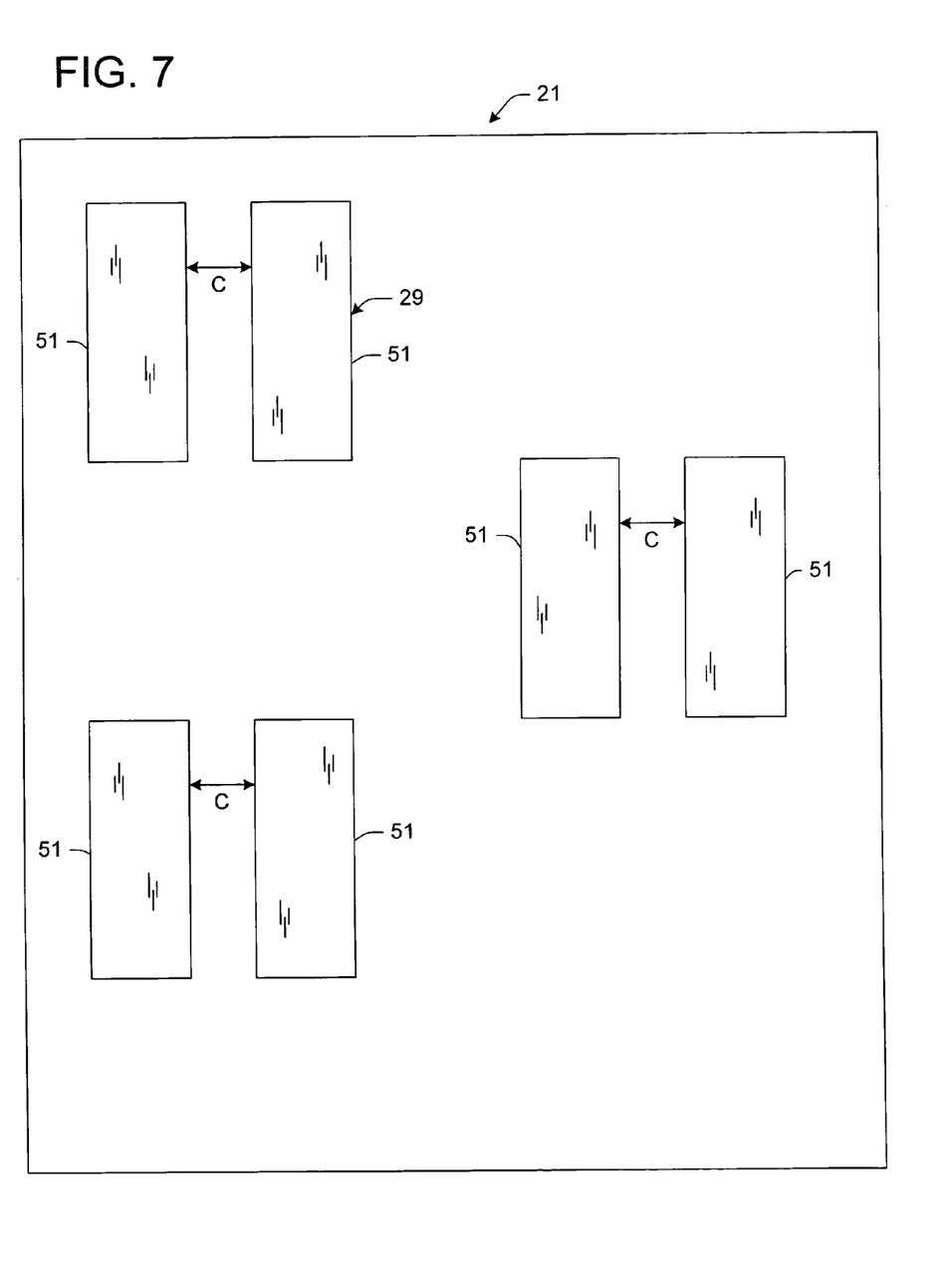
FIG. 7 is a schematic bottom view of another device of the claimed invention comprising six electrodes.

Referring now to FIG. 6, a schematic bottom view of another embodiment of the claimed invention, four electrodes 51 are depicted mounted on the device 21. The four electrodes 51 are arranged in pairs, such that adjacent, paired electrodes work together as individual capacitance sensors. With four electrodes 51 cooperating as two electrode pairs, therefore, the sensitivity of the device 21 may be increased because two capacitance sensors communicate with the controller 33 for determining the distance between the tracking surface 25 and the device 21. Referring now to FIG. 7, another schematic bottom view of yet another embodiment of the claimed invention, six electrodes 51 are depicted mounted on the device 21. The six electrodes 51 are arranged in pairs, such that adjacent, paired electrodes work together as individual capacitance sensors. With six electrodes 51 cooperating as three electrode pairs, therefore, the sensitivity of the device 21 may be further increased because three capacitance sensors communicate with the controller 33 for determining the distance between the tracking surface 25 and the device 21. A greater number of paired electrodes 51 may be incorporated into the device 21 for greater sensitivity, without departing from the scope of the claimed invention. In addition to increased sensitivity, a greater number of paired electrodes 51 properly arranged may also provide information relating to the direction and speed of relative movement between the device 21 and the tracking surface 25 during lift-off. In one example (e.g., FIG. 6), a series of paired electrodes 51 are arranged along a y-direction (more electrode pairs may be incorporated in said series than are depicted in FIG. 6). By detecting the time sequence of capacitance changes sensed by the paired electrodes 51, the direction and speed of relative movement between the device 21 and the tracking surface 25 may be determined during the lift-off.

Figure 8:
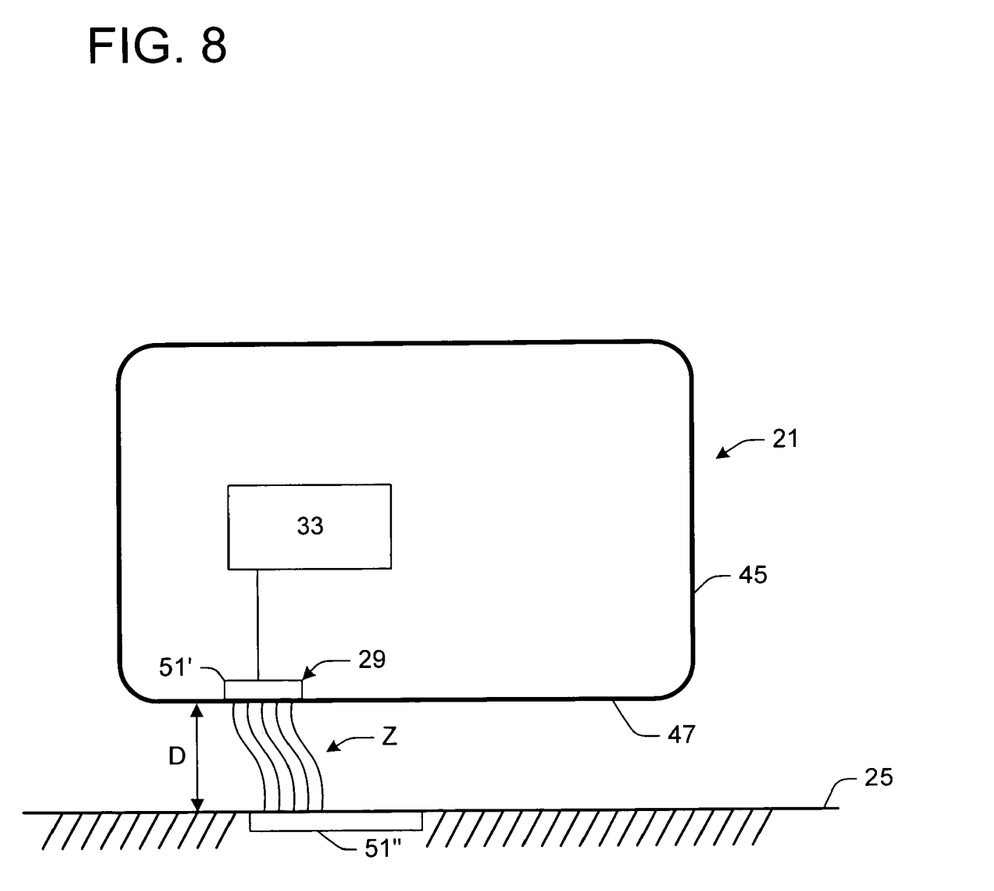
FIG. 8 is a schematic plan view of another device of the claimed invention lifted from the tracking surface.

Referring now to FIG. 8, a schematic of another device 21 of the claimed invention is depicted lifted from the tracking surface 25. In this embodiment, the two electrodes comprise a first electrode 51' shaped and sized to mount on the data input device 21 and a second electrode 51" comprising the tracking surface 25. The tracking surface 25 may either comprise the second electrode 51" or the second electrode may be mounted on the tracking surface. In either case, the capacitance is measured between the first electrode 51' on the device 21 and the second electrode 51" on the tracking surface 25 to determine the proximity of the device relative to the tracking surface.

As introduced above, in the several embodiments of the claimed invention, the impedance sensor 29 may be constructed to function in a variety of different ways, depending upon the desired sensing capabilities of the device 21. The first of these general sensing types was discussed previously, namely, capacitance sensing. In addition to capacitance sensing, in another embodiment, the impedance sensor 29 may be a resistance sensor for measuring an electrical resistance between two electrodes 51, thereby determining if the data input device 21 and the tracking surface 25 are separated from one another as a function of the measured resistance. Referring again to FIGS. 1 and 2, the data input device 21 passes current (e.g., direct current) between the two electrodes 51, such that the resistance sensor may determine if the tracking surface 25 is separated from the data input device 21 by measuring changes in the resistance between the electrodes. As discussed above with respect to the capacitance sensor, the data input device 21 comprising the resistance sensor further comprises a housing 45 shaped and sized to engage the tracking surface 25. In addition, the two electrodes 51 are shaped and sized to mount on an outer surface of the housing 45. To ensure that the resistance sensor can determine when the device 21 is lifted from the tracking surface 25, the housing 45 is formed from material having a higher resistance than the tracking surface. Thus, with the housing 45 engaging the tracking surface 25 (see FIG. 1), the resistance is measured through the tracking surface, which offers the path of least resistance to the current. Once the device 21 is lifted (see FIG. 2), however, the measured resistance increases because the resistance is now measured through the housing 45 or air, both of which have a greater resistance than the tracking surface 25. As such, the device 21 is able to ascertain lift-off from the tracking surface 25. Unlike the capacitance measurements discussed in the previous embodiment, resistance measurements do not provide for continuous monitoring of the distance between the device 21 and the tracking surface 25. In this embodiment, the resistance sensor resolves two resistances, namely the housing 45, or air, resistance or the tracking surface 25 resistance, to achieve a two-state detection of off-surface or on-surface.

Yet another data input device 21 comprises a resistance sensor arranged with respect to the tracking surface 25 and having a measurement zone Z within which the resistance sensor measures an electrical resistance. In this embodiment, measurement zone Z is defined by a current path (not shown) through the tracking surface 25. The data input device 21 further comprises a controller 33 receiving data from and responsive to the resistance sensor for determining if the device is spatially separated from the tracking surface 21 by at least a lift-off detection distance D as a function of the measured resistance. The controller 33 initiates a non-tracking mode, in which the controller suspends tracking of relative movement between the data input device 21 and the tracking surface 25, when the data input device is spatially separated from the tracking surface by at least the lift-off detection distance D (see FIG. 2). The controller 33 is further responsive to the measured resistance for detecting the proximity of the device 21 and the tracking surface 25 relative to one another as a function of the measured resistance. The controller then determines whether the device 21 is spatially separated from the tracking surface 25 by at least the lift-off detection distance D, or if the device 21 may remain in a tracking mode. The device 21 further comprises two electrodes 51, generally as set forth above. The device 21 is adapted to energize the two electrodes with direct current, or alternating current, and measure the resistance between the two electrodes to determine the spatial separation between the tracking surface 25 and the data input device. As discussed above with respect to capacitance sensing, a greater number of paired electrodes 51 may also be incorporated with resistance sensing to provide increased sensitivity and information relating to the direction and speed of relative movement between the device 21 and the tracking surface 25 during lift-off.

In addition to capacitance and resistance sensing, in another embodiment, the impedance sensor 29 may comprise an inductance sensor mounted on the device 21 and a tracking surface 25 comprised of a magnetic material. A controller 33 of the data input device 21 is tunable to detect relative movement between the device and the tracking surface 25 as a function of an inductance measured by the inductance sensor as the device moves with respect to the magnetic material. In this embodiment, an inductance-capacitance (LC) resonance circuit 53 shaped and sized to connect to the inductance sensor interacts with the magnetic material of the tracking surface 25, as would be readily understood by one skilled in the art. As discussed above with respect to capacitance and resistance sensing, a greater number of inductance sensors may be incorporated to provide increased sensitivity and information relating to the direction and speed of relative movement between the device 21 and the tracking surface 25 during lift-off. In addition, as discussed above with respect to capacitance measurements, continuous inductance measurements also provide for continuous monitoring of the distance between the device 21 and the tracking surface 25, within a given working range of the device.

Figure 9:
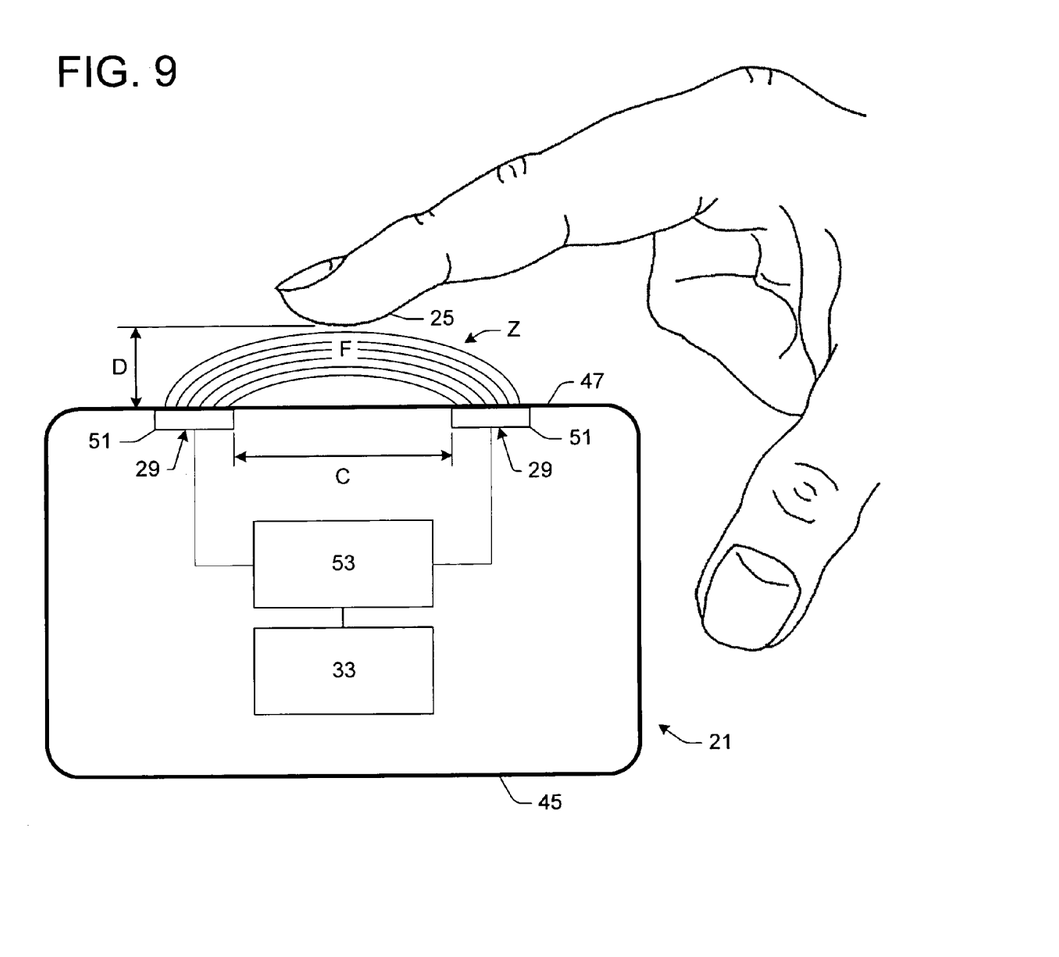
FIG. 9 is a schematic plan view of the device of FIG. 1 engaging a tracking surface of human skin.

Turning now to FIG. 9, a device 21 is depicted wherein the tracking surface 25 is human skin. In particular, the tracking surface 25 shown is a human finger. This device 21 demonstrates that the device itself may be stationary while the tracking surface 25 moves relative to the device. The functioning of the device components, such as the controller 33, the circuit 53, the electrodes 51 and the housing 45 are similar to those taught above. The device 21 depicted in FIG. 9 allows the user to move his hand, the tracking surface 25, over the device such that when the finger moves away from the device, the electrodes 51, the circuit 53 and the controller 33 are able to detect lift-off and stop tracking, respectively. Both capacitance and resistance sensing are useful with such a device 21.

The claimed invention further comprises a method comprising energizing the two electrodes 51 operatively connected to the data input device 21, which is configured to interact with a tracking surface 25, generally as set forth above. The method further comprises measuring an electrical impedance between the two electrodes 51 and determining the relative distance between the data input device 21 and the tracking surface 25 as a function of the measured impedance. As discussed above with respect to the data input device 21, the measuring may comprise measuring an electrical capacitance between the two electrodes 51 or measuring an electrical resistance between the two electrodes.

Another method of the claimed invention detects lift-off of the data input device 21 from the tracking surface 25. The method comprises energizing the two electrodes 51 as set forth above and measuring an electrical impedance between the two electrodes 51. The method may initiate a non-tracking mode, as a function of the measured impedance, wherein the controller 33 suspends tracking of relative movement between the data input device 21 and the tracking surface 25, when the data input device is spatially separated from the tracking surface by at least a lift-off detection distance D. In addition, the method may initiate a tracking mode, as a function of the measured impedance, wherein the controller 33 tracks relative movement between the data input device 21 and the tracking surface 25, when the data input device is not spatially separated from the tracking surface by at least a lift-off detection distance D. Another method comprises measuring an electrical capacitance between the two electrodes 51, generally as set forth above. Yet another method comprises measuring an electrical resistance between the two electrodes 51, generally as set forth above.

Many different devices 21 may be constructed according to the above methods. In this example, one device comprises a lift-off detection distance D of no more than about 4 millimeters (0.16 inch). Another device comprises a lift-off detection distance D of no more than about 4 millimeters (0.16 inch) and at least about 0.5 millimeter (0.02 inch). Yet another device comprises a lift-off detection distance D of no more than about 3 millimeters (0.12 inch) and at least about 0.5 millimeter (0.02 inch).

Figure 10:
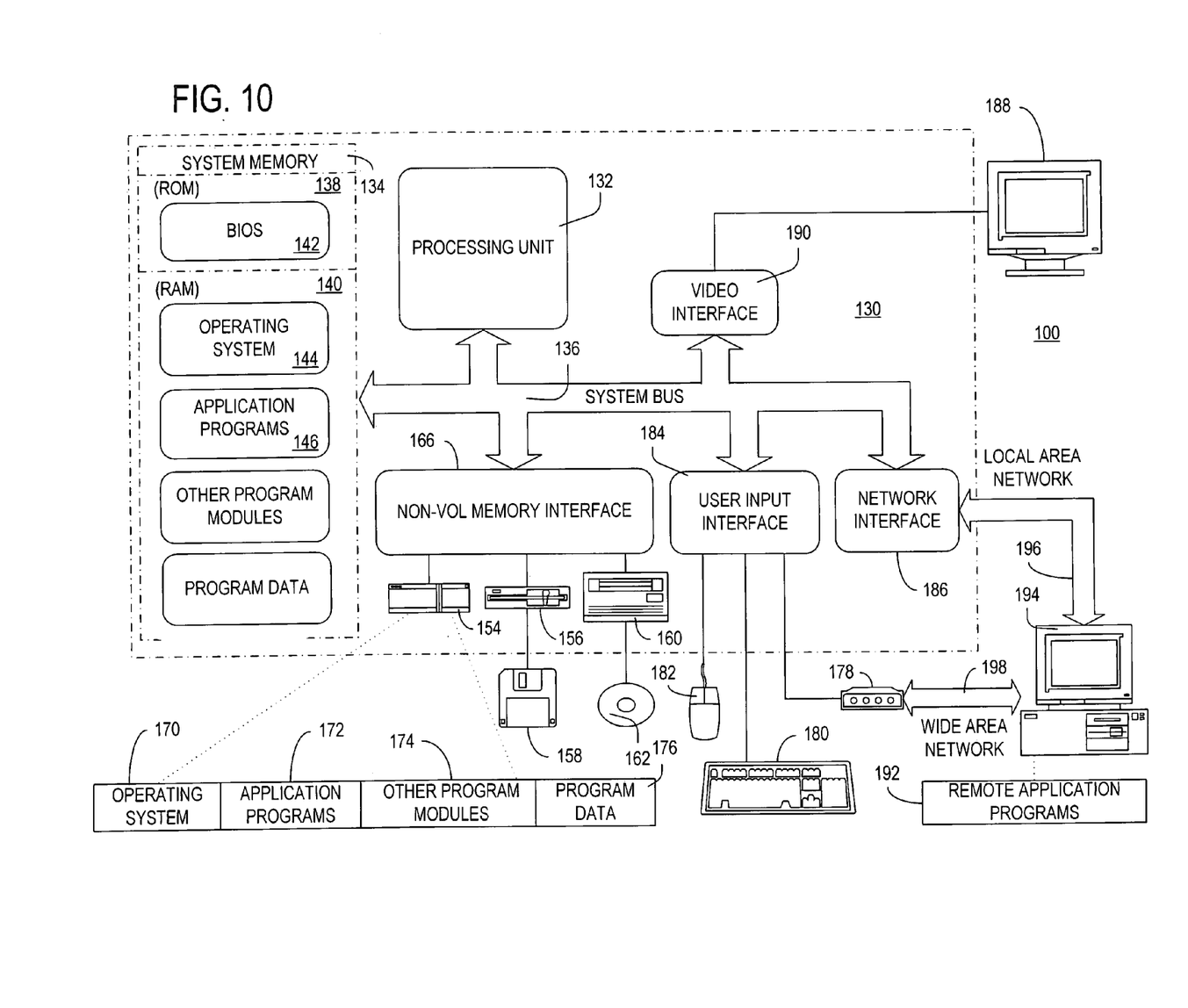
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid-state RAM, solid-state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or substantially all of the elements described above relative to computer 130. The logical connections depicted in FIG. 10 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the claimed invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A handheld mouse device for tracking relative movement between said handheld mouse device and a tracking surface, comprising:
   an impedance sensor arranged with respect to a tracking surface, said impedance sensor having a measurement zone within which said impedance sensor measures an electrical capacitance; and
   a controller responsive to the measured capacitance of said impedance sensor for determining a distance of spatial separation between the handheld mouse device and the tracking surface relative to one another as a function of the measured capacitance, the handheld mouse being removable from the tracking surface, said controller initiating a non-tracking mode in which said controller suspends tracking of relative movement between said handheld mouse device and said tracking surface when said handheld mouse device is removed from the tracking surface and is spatially separated from said tracking surface by at least a lift-off detection distance, said controller further being responsive to the measured capacitance of said impedance sensor for determining a direction of relative movement between said handheld mouse device and said tracking surface as a function of the measured capacitance.

2. The handheld mouse device as set forth in claim 1 wherein said handheld mouse device is in a tracking mode when determining whether said handheld mouse device is spatially separated from said tracking surface by at least the lift-off detection distance.

3. The handheld mouse device as set forth in claim 2 wherein said impedance sensor is shaped and sized to face said tracking surface when said handheld mouse device is in said tracking mode.

4. The handheld mouse device as set forth in claim 1 further comprising a housing shaped and sized to engage said tracking surface, said impedance sensor and controller being at least partially enclosed within said housing.

5. The handheld mouse device as set forth in claim 4 wherein said impedance sensor is shaped and sized to mount on a surface of the housing and shaped and sized to engage said tracking surface.

6. The handheld mouse device as set forth in claim 1 wherein said impedance sensor comprises at least six electrodes.

7. The handheld mouse device as set forth in claim 1 wherein said impedance sensor comprises a capacitance sensor having at least two electrodes for measuring the electrical capacitance between said at least two electrodes and wherein said controller is configured for determining the distance of spatial separation between the handheld mouse device and the tracking surface relative to one another as a function of the measured capacitance.

8. The handheld mouse device as set forth in claim 7 wherein said at least two electrodes are arranged adjacent one another, said at least two electrodes being substantially equidistant from one another such that the at least two electrodes maintain a minimum clearance with respect to one another.

9. The handheld mouse device as set forth in claim 8 wherein a first electrode comprises a substantially circular conductor and a second electrode comprises a substantially annular conductor surrounding said substantially circular conductor, said first and second electrodes maintaining a minimum clearance between one another between an outer perimeter of the substantially circular conductor and an inner circumference of the substantially annular conductor.

10. The handheld mouse device as set forth in claim 8 wherein first and second electrodes comprise substantially comb-shaped conductors having digits extending at regular intervals from an edge of each electrode, said digits of said first electrode being interdigitized with the digits of said second electrode.

11. The handheld mouse device as set forth in claim 7 wherein said capacitance sensor creates a fringing field capable of determining the distance of spatial separation between the tracking surface and the handheld mouse device relative to one another as a function of measured changes in a dielectric constant of the tracking surface and a dielectric constant of ambient air between the handheld mouse device and the tracking surface when separated from one another.

12. The handheld mouse device as set forth in claim 7 further comprising a resistance-capacitance (RC) resonance circuit shaped and sized to connect to the capacitance sensor.

13. The handheld mouse device as set forth in claim 7 wherein said at least two electrodes comprise a first electrode shaped and sized to mount on said handheld mouse device and a second electrode comprising said tracking surface.

14. The handheld mouse device as set forth in claim 1 wherein said impedance sensor further comprises an inductance sensor and said tracking surface is comprised of a magnetic material, and wherein said controller is tunable to detect relative movement between the handheld mouse device and the tracking surface as a function of an inductance measured by the inductance sensor.

15. The handheld mouse device as set forth in claim 14 further comprising an inductance-capacitance (LC) resonance circuit shaped and sized to connect to said inductance sensor to interact with said magnetic material of said tracking surface.

16. The handheld mouse device as set forth in claim 1 wherein said tracking surface is human skin.

17. The handheld mouse device as set forth in claim 1 wherein said lift-off detection distance is no more than about 4 millimeters (0.16 inch).

18. The handheld mouse device as set forth in claim 17 wherein said lift-off detection distance is no more than about 4 millimeters (0.16 inch) and at least about 0.5 millimeter (0.02 inch).

19. The handheld mouse device as set forth in claim 18 wherein said lift-off detection distance is no more than about 3 millimeters (0.12 inch) and at least about 0.5 millimeter (0.02 inch).

20. The handheld mouse device as set forth in claim 1 wherein said impedance sensor comprises at least two electrodes.

21. The handheld mouse device as set forth in claim 20 wherein said impedance sensor comprises at least four electrodes.

22. A handheld mouse device comprising:

a resistance sensor arranged with respect to a tracking surface, said resistance sensor having a measurement zone within which said resistance sensor measures an electrical resistance; and a controller responsive to the measured resistance of said resistance sensor for:

determining spatial separation between the tracking surface and the handheld mouse, said handheld device being removable from the tracking surface, said controller initiating a non-tracking mode in which said controller suspends tracking of relative movement between said handheld mouse device and said tracking surface when said handheld mouse device is removed from the tracking surface and is spatially separated from said tracking surface by at least a lift-off detection distance; and determining a speed of relative movement between the handheld mouse device and the tracking surface.

23. The handheld mouse device as set forth in claim 22 wherein said resistance sensor further comprises at least two electrodes, said handheld mouse device adapted to energize said at least two electrodes with direct current and measure the resistance between said at least two electrodes to determine if said handheld mouse device is spatially separated from said tracking surface by at least the lift-off detection distance.

24. The handheld optical mouse device as set forth in claim 22 wherein said resistance sensor further comprises at least two electrodes, said handheld mouse device adapted to energize said at least two electrodes with alternating current and measure the resistance between said at least two electrodes to determine if said handheld mouse device is spatially separated from said tracking surface by at least the lift-off detection distance.

25. The handheld mouse device as set forth in claim 22 further comprising a housing shaped and sized to engage the tracking surface, said resistance sensor being shaped and sized to mount on an outer surface of said housing.

26. The handheld mouse device as set forth in claim 25 wherein said housing is formed from material having a higher resistance than the tracking surface.

\* \* \* \* \*